United States Patent [19]
Walters et al.

[11] Patent Number: 5,768,593
[45] Date of Patent: Jun. 16, 1998

[54] DYNAMIC CROSS-COMPILATION SYSTEM AND METHOD

[75] Inventors: Chad Perry Walters, Redwood City; Jorg Anthony Brown, Concord, both of Calif.

[73] Assignee: Connectix Corporation, San Mateo, Calif.

[21] Appl. No.: 620,387

[22] Filed: Mar. 22, 1996

[51] Int. Cl.$^6$ .............................. G06F 9/30; G06F 9/44
[52] U.S. Cl. ........................ 395/705; 395/707; 395/709; 395/500; 395/581
[58] Field of Search .................... 395/700, 701–710, 395/712, 500, 581

[56] References Cited

U.S. PATENT DOCUMENTS

| | | | |
|---|---|---|---|
| 4,667,290 | 5/1987 | Goss et al. | 395/707 |
| 5,167,023 | 11/1992 | De Nicolas et al. | 395/527 |
| 5,179,703 | 1/1993 | Evans | 395/703 |
| 5,204,960 | 4/1993 | Smith et al. | 395/707 |
| 5,367,683 | 11/1994 | Brett | 395/709 |
| 5,625,822 | 4/1997 | Brett | 395/705 |
| 5,649,203 | 7/1997 | Sites | 395/709 |
| 5,692,196 | 11/1997 | Unni et al. | 395/705 |

*Primary Examiner*—Emanuel Todd Voeltz
*Assistant Examiner*—Tuan Q. Dam
*Attorney, Agent, or Firm*—Gary S. Williams; Flehr Hohbach Test Albritton & Herbert LLP

[57] ABSTRACT

In a computer system, a cross-compiler converts non-native code into native code immediately prior to execution of that code. The system also includes a code cache for storing cross-compiled code and a hash table for locating code blocks in the code cache. In a preferred embodiment, the system also includes an interpreter for emulating certain non-native instructions that are not converted into native code by the cross-compiler. While executing any non-native application, if the next instruction is not one of the pre-defined set of non-native instructions to be handled by interpretation or a special purpose procedure, then the next instruction is considered to be an "entry point" instruction, and the cross-compiler looks up the address of the entry point instruction in the hash table to see if a corresponding native code block is already stored in the code cache. If so, the native code block in the code cache is executed until an exit instruction in the native code block is encountered. Otherwise, the cross-compiler cross-compiles all code that is reachable from the entry point instruction during execution of the program without going outside the compilation window. During compilation the cross-compiler determines the non-native condition codes generated by a non-native instruction that will not be used by any successors of the non-native instruction. The native code instructions generated by the cross-compiler do not include instructions for processing non-native condition codes generated by the non-native instruction that will not be used by any successors of the qualifying non-native instruction.

12 Claims, 5 Drawing Sheets

Cross-Compilation Phase 1

↓ ⸺222

Determine all qualifying instructions in compilation window that are reachable from the entry point instruction without leaving the compilation window, and generate information table entry for each qualifying instruction.

Cross-Compilation Phase 2

↓ ⸺224

Set exit instruction CCR flags to True

↓ ⸺226

Chain backwards from exit instructions to compute CCR flags for all qualifying instructions:
CCR(i) = CCN(i+1) OR ( CCR(i+1) & NOT CCM(i+1) )

↓ ⸺228

For each branch instruction, invoke the CCR Merge procedure referenced by its information table entry to generate a merged CCR value, and to replace the CCR Merge procedure reference in the information table with a code generation procedure reference.

Cross-Compilation Phase 3

↓ ⸺230

For each qualifying instruction, invoke the code generation procedure referenced by its information table entry to generate the corresponding native code block.

↓ ⸺232

Store native code block in code cache.
Generate hash table entry for stored code block.
Mark code chunk map for page corresponding to entry point instruction.

FIG. 5

DYNAMIC CROSS-COMPILATION SYSTEM AND METHOD

DYNAMIC CROSS-COMPILATION SYSTEM AND METHOD

The present invention relates generally to computer systems that include facilities for executing programs that have been compiled to run on a different computer architecture than the computer architecture utilized by the computer executing the program, and particularly to a "just in time" cross compilation system and method for dynamically cross compiling programs originally compiled to execute on a different computer architecture than the computer architecture utilized by the computer executing the program.

BACKGROUND OF THE INVENTION

The term "architecture" is defined for the purposes of this document to mean the operating characteristics of a family of computer models. Examples of specific architectures include Macintosh computers using Motorola 68xxx microprocessors, Macintosh computers using PowerPC microprocessors, IBM PC compatible computers using the DOS or Windows operating systems, Sun Microsystems computers running the Solaris operating system, and computer systems using the Unix operating system.

The use of emulators to run computer programs written for a first computer platform on a second computer platform is well known. The main component of an emulator is typically an interpreter that converts each instruction of any program in machine language A into a set of instructions in machine language B, where machine language B is the native code language of the computer on which the emulator is being used. In some instances, interpreters have been implemented in computer hardware, thereby enabling relatively fast execution of the emulated programs.

Another form of interpreters known to those skilled in the art are "virtual machines." Virtual machines can be used execute architecture neutral programs on specific computer platforms. The term architecture neutral is defined for the purposes of this document to refer to programs whose code is written in a language that can be executed on a variety of computer systems with different architectures. That is, programs written in an architecture neutral programming language are independent of the specific architecture of a computer system. A computer system can be configured with a "virtual machine" module to enable execution of programs with code written in a corresponding architecture neutral language.

It is also well known that the execution speed of computer programs is dramatically reduced by interpreters. It is not uncommon for a computer program to run ten to twenty times slower when it is executed via emulation than when the equivalent program is recompiled into native machine code and the native code version is executed.

While interpretation of computer programs is well known to be slow, it is nevertheless the case that many computer programs are not rewritten and recompiled for use on new computer platforms. This happens for many reasons, most revolving around the lack of economic incentive. Thus, it is not uncommon for some programs to be widely used, via interpreters, on computer platforms other than the computer platform for which they were originally written and compiled. For instance, there are numerous computer programs written for the versions of the Apple Macintosh computer product line using Motorola 68xxx microprocessors (e.g., the 68020, 68030 and 68040) that, despite wide used on the versions of the Apple Macintosh computer product line using PowerPC (PPC) microprocessors (e.g., the PPC601, PPC603, and PPC604), have not been rewritten and recompiled for the PPC microprocessor platform.

Due to the well known slowness of software emulation, a number of products, including the versions of the Apple Macintosh computer product line using PPC microprocessors, have successfully improved on the speed of executing non-native applications by dynamically cross-compiling portions of such programs at run time into native machine code, and then executing the recompiled program portions. While the cross-compilation process typically takes 50 to 100 machine cycles per instruction of non-native code, the greater speed of the resulting native machine code is, on average, enough to improve the overall speed of execution of most non-native applications.

The primary reason that overall execution speed is improved by cross-compilation is that most programs contain execution loops of instructions that are repeatedly executed hundreds, thousands, or even millions of times during a typical execution of the program. By avoiding repeated interpretation of the instructions in such loops, substantial execution time is saved.

While run time cross-compilation of non-native applications is well known to those skilled in the art, there are several areas in which existing cross-compilation systems have fallen short of their potential.

In particular, existing cross-compilation systems generally cross-compile non-native code in very small blocks, sometimes called basic blocks. The code blocks to be cross-compiled are generally kept short, rarely exceeding 25 non-native code instructions, based on the belief that cross-compiling larger code blocks would (A) result in the cross-compilation of too much code that would never be executed, and (B) would delay the start of execution of the application so long as to be noticeable to users of the application. However, the inventors of the present invention have determined that the cross-compilation of small code blocks is a seriously flawed methodology because it makes the generation of efficient native code virtually impossible. That is, optimization of the generated native code usually requires information about non-native instructions that are outside the scope of such small code blocks.

Another area in which existing cross-compilation systems generally fall short is their handling of condition codes. Condition codes are binary flag values generated by a data processor when executing various instructions, and that are used by various subsequent instructions to govern their execution. It is a well known fact that the condition codes used, and their exact definitions and usage, vary from computer platform to computer platform. As a result, often the majority of the native code generated by a cross-compiler is dedicated to keeping track of and using non-native condition codes (i.e., the condition codes associated with the computer platform for which the non-native application was written). However, the inventors of the present invention have determined that analysis of the program being cross-compiled can often substantially reduce the amount of native code required to track and use the non-native condition codes. It is therefore a goal of the present invention to determine the condition codes required by the instructions subsequent to a particular instruction, and to thereby avoid the generation of instructions for storing condition codes generated by that particular instruction but that are not required by any of the subsequent instructions.

Since conditional branch instructions are often used at the end of execution loops in programs, conditional branch instructions are often executed large numbers of times. The inventors of the present invention have determined that optimization of the cross-compilation of such instructions is likely to have a disproportionately beneficial affect on the execution performance of cross-compiled programs. It is another goal of the present invention to minimize the native code instructions generated for non-native code conditional branch instructions by minimizing the number of native code instructions used to handle non-native condition codes.

Another area in which existing cross-compilation systems fall short is in the handling of cache flush instructions and partial cache flush instructions. Typically, existing cross-compilation systems have treated such instructions as indicating that the application being executed is a "self-modifying program," meaning that the program's execution is modifying a portion of itself. Most often, self-modifying programs modify addresses stored in various tables used to call subroutines and other procedures. Whenever a program modifies itself, it generally flushes all or a portion of the computer's cache memory to ensure that the computer does not continue to use an old version of the computer program. Since such cache flush instructions indicate that the executing program may be modifying itself, existing cross-compilation systems have generally treated such instructions as a requirement that all cross-compiled code be flushed, requiring re-compilation of all non-native code as it is executed. The present invention provides a mechanism for quickly and accurately determining the section or sections of code the application has potentially modified when a partial cache flush instruction is executed, enabling less of the cross-compiled code to be flushed.

SUMMARY OF THE INVENTION

In summary, the present invention is a cross-compilation and emulation subsystem and method for converting, at run time, non-native code into native code immediately prior to execution of that code. The system includes a code cache for storing cross-compiled code, a hash table for locating code blocks in the code cache, a cross-compiler for converting blocks of non-native code into blocks of native code. In a preferred embodiment, the system also includes an interpreter for emulating certain non-native instructions that are not converted into native code by the cross-compiler.

Whenever the data processor on which the cross-compiler is being used executes a non-native application, the cross-compiler is activated. The cross-compiler remains in control of program execution until execution of a native code application (excluding cross-compiled programs in the code cache) is initiated. It should be understood that the code in non-native applications is essentially "data" that is processed by the cross-compiler because non-native code cannot be executed directly by the data processor.

While executing any non-native application, whenever the next instruction to be executed is an uncompiled, non-native instruction, the cross-compiler looks up the address of that next instruction in the hash table to see if a corresponding native code block is already stored in the code cache. If so, the native code block in the code cache is executed until an exit instruction in the native code block is encountered. If there is no corresponding native code block in the code cache, the cross-compiler begins compilation of a code block having an entry point instruction composed of the aforementioned next non-native instruction. If, during decoding of the entry point instruction by the cross-compiler it is determined that the entry point instruction is one of a predefined set of non-native instructions to be executed by an interpreter, then that instruction is executed by the interpreter. Otherwise, the cross-compiler continues with compilation of a block of non-native code.

The cross-compiler cross-compiles an extended block of "qualifying" non-native code within a "compilation window" of the entry point instruction, such as a window that begins one thousand bytes before the entry point instruction and ends 1000 bytes after the entry point instruction. Qualifying non-native code comprises all code that is reachable from the entry point instruction during execution of the program without going outside the compilation window and without having to first execute (A) an instruction by the interpreter, or (B) an instruction, such as a subroutine return instruction or a jump to an address in a register, whose successor instruction cannot be determined at compilation time. In the cross-compiled code, an exit instruction is inserted for each instruction to be interpreted and for each instruction that causes or could cause execution of an instruction outside the compilation window.

During compilation of the qualifying code in a compilation window, the cross-compiler determines not only the non-native condition codes generated by each qualifying non-native instruction and the non-native condition codes needed to control the execution of the qualifying non-native instruction, but also determines all the non-native condition codes generated by the qualifying non-native instruction that will not be used by any successors of the qualifying non-native instruction. The native code instructions generated by the cross-compiler for a particular qualifying non-native instruction do not include any instructions for processing non-native condition codes generated by the qualifying non-native instruction that will not be used by any successors of the qualifying non-native instruction.

In a preferred embodiment, the cross-compiler of the present invention has two optimizations for handling full cache flush instructions and partial cache flush instructions. In particular, the cross-compiler maintains a "code chunk map" for indicating, for each "page" of the address space, whether or not the code cache stores at least one code block corresponding to a non-native entry point instruction in the page. For instance, using a "page" size of 1 kilobyte (1024 bytes), the code chunk map will store a "1" bit for each page that contains a non-native entry point instruction for which there is a code block in the code cache.

Whenever a partial cache flush instruction is executed, the specified portion of the system's cache memory is cleared, and any corresponding entries in the hash table and code chunk map are also cleared. More particularly, the code chunk map entries corresponding to the flushed address range are inspected, and for each code chunk map entry that is set a corresponding portion of the hash table is cleared so as to prevent use of the corresponding code blocks in the code cache. This is more efficient than simply invalidating all code blocks in the code cache because it allows much of the previously cross-compiled code in the code cache to continue to be used.

The use of the code chunk map enables the cross-compiler system to efficiently identify all code blocks in the code cache that are potentially invalid and to clear their corresponding entries in the hash table. In many cases none of the memory pages corresponding to a partial cache clear operation have bits set in the code chunk map, thereby enabling the a system utilizing the present invention to avoid clearing any items in the hash table. Thus, the use of the code chunk map results in a substantial improvement in the efficiency of the recompiler.

Whenever a full cache flush instruction is executed, in the preferred embodiment of the present invention the hash table is cleared except for entries corresponding to procedures that are known not to be self-modifying. For instance, procedures stored in a read-only memory (ROM) can not be self-modifying and therefore the preferred embodiment of the present invention does not clear the hash table entries corresponding to code blocks for procedures stored in ROM when it executes a full cache flush instruction.

In another aspect of the present invention, the cross-compiler of the preferred embodiment performs additional processing so as to minimize the native code instructions generated for non-native code conditional branch instructions by minimizing the number of native code instructions used to handle non-native condition codes. For instance, the cross-compiler determines whether a conditional branch instruction is the target of any other branch instruction(s) within the compilation window and whether it is immediately preceded by a comparison instruction. If the conditional branch instruction is the target of another branch instruction within the compilation window (or is an entry point instruction), and is immediately preceded by a comparison instruction, the cross-compiler converts the non-native comparison instruction into native instructions for generating and storing non-native condition codes, and converts the conditional branch instruction into a sequence of instructions for determining the status of the relevant non-native condition codes prior to performing a conditional branch. In a preferred embodiment the two non-native instructions are converted into eight native instructions.

When a conditional branch instruction is not the target of another branch instruction within the compilation window, is not an entry point instruction, and is immediately preceded by a comparison instruction, the cross-compiler generates just two native code instructions: a native comparison instruction and a native conditional branch instruction. Thus, this optimization reduces the number of native instructions generated from eight to two for executing the type of condition branch often found at the end of execution loops.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
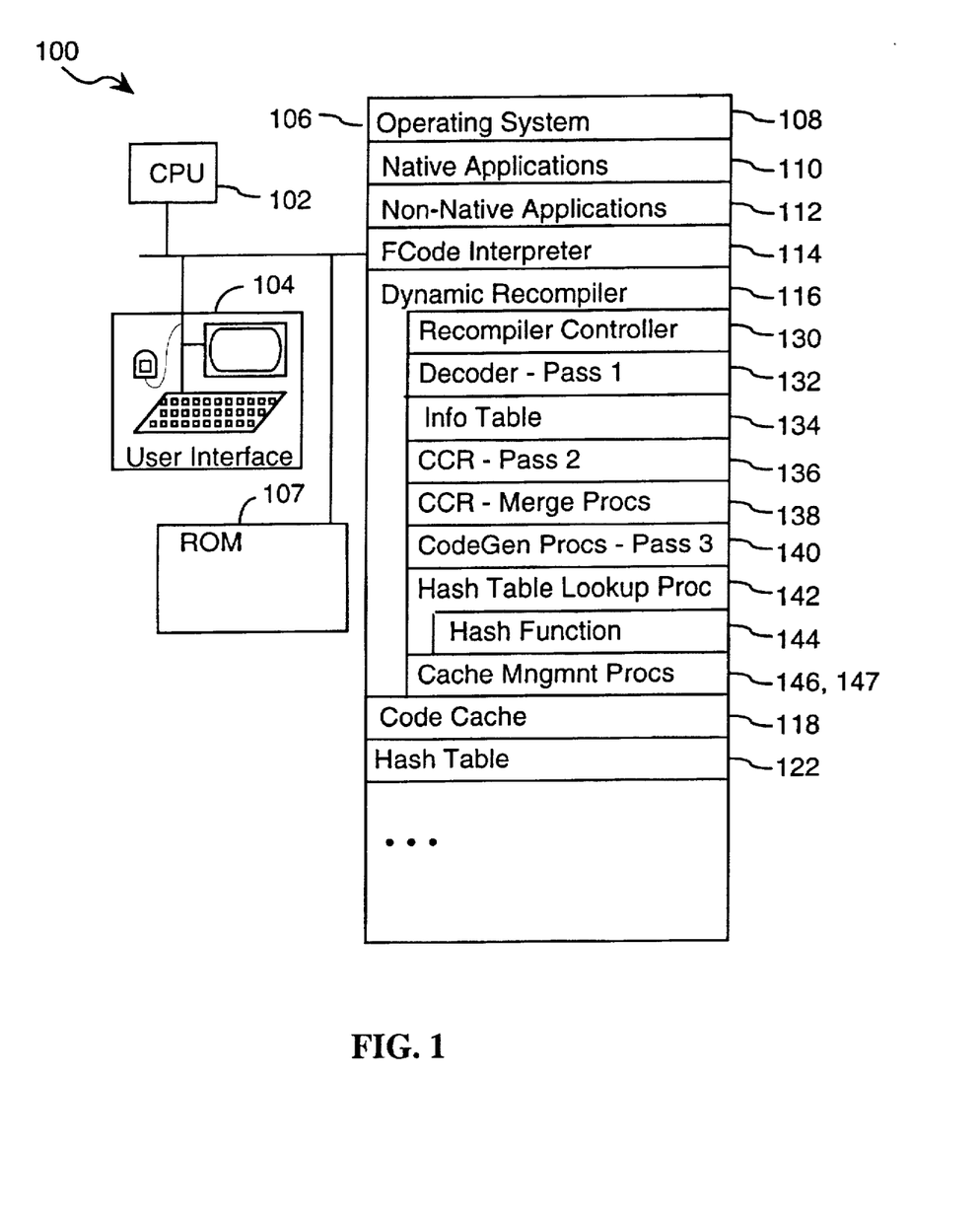
FIG. 1 is a block diagram of a computer system including a preferred embodiment of the cross-compiler of the present invention.

Referring to FIG. 1, there is shown a computer system 100 incorporating a preferred embodiment of the present invention. In the preferred embodiment the computer system is a Macintosh computer system, such as Macintosh 9500, made by Apple Computer. However, as will be explained below, the present invention is equally applicable to virtually all other computer platforms, including IBM PC-compatible computers, SPARC and MIPS based workstations. The computer system 100 typically includes a central processing unit (CPU) 102, a user interface 104 and memory 106, including both random access memory (RAM) and persistent storage, such as a hard disk storage system. The computer system 100 also includes a read only memory (ROM) 107. The memory 106 stores:

- an operating system 108, portions of which are also stored in ROM 107;
- native code computer programs 110 (herein generally called "applications") that can be executed directly by the CPU 102;
- non-native code applications 112, herein sometimes called "foreign code" applications, that cannot be executed directly by the CPU 102, and instead must be executed using a foreign code interpreter 114;
- the aforementioned foreign code interpreter 114 for executing foreign code programs;
- a dynamic recompiler 116, also known as a cross-compiler, for dynamically cross-compiling portions of foreign code applications into native code, at run time;
- a code cache 118 for storing native code blocks 120 (see FIG. 2) generated by the dynamic recompiler 116; and
- a hash table 122 for locating native code blocks 120 stored in the code cache 118.

The dynamic recompiler 116 includes:

- a recompilation controller procedure 130;
- a foreign code application decoder 132, which performs the first pass of a three pass dynamic recompilation procedure;
- an information table 134, which is generated by the decoder 132 to keep track of various properties of the instructions in the foreign code application being recompiled;
- a condition code requirement procedure 136, for determining which non-native condition codes must be maintained by the compiled native code; the condition code requirement procedure 136 performs the second pass of the three pass compilation procedure;
- a set of condition code merger procedures 138, that are utilized by the aforementioned condition code requirement procedure 136;
- a set of code generation procedures 140 that are called by the control procedure 130 to perform the third pass of the three pass compilation procedure; and
- a hash table lookup procedure 142 that uses a hash function 144 to determine whether the code cache 118 contains a native code block corresponding to a non-native application code block having a specified entry point, and if so, where that native code block is located in the code cache 118.

In the preferred embodiment, the non-native applications 112 and non-native code blocks contain Motorola 68000 microprocessor machine code instructions, while native code applications and native code blocks contain PowerPC (PPC) microprocessor machine code instructions. Furthermore, despite the use of a dynamic recompiler 116, in the preferred embodiment, the interpreter 114 is used to execute a small number of non-native code instructions, particularly supervisor level instructions, a 64 bit division instruction, and a few others that are approximately as efficient to execute using the interpreter 114 as they would be if recompiled into native code. However, if an interpreter 114 were not already provided by the computer system 100, the dynamic recompiler 116 would be reconfigured to recompile or otherwise handle the execution of all the instructions in non-native code applications.

Figure 2:
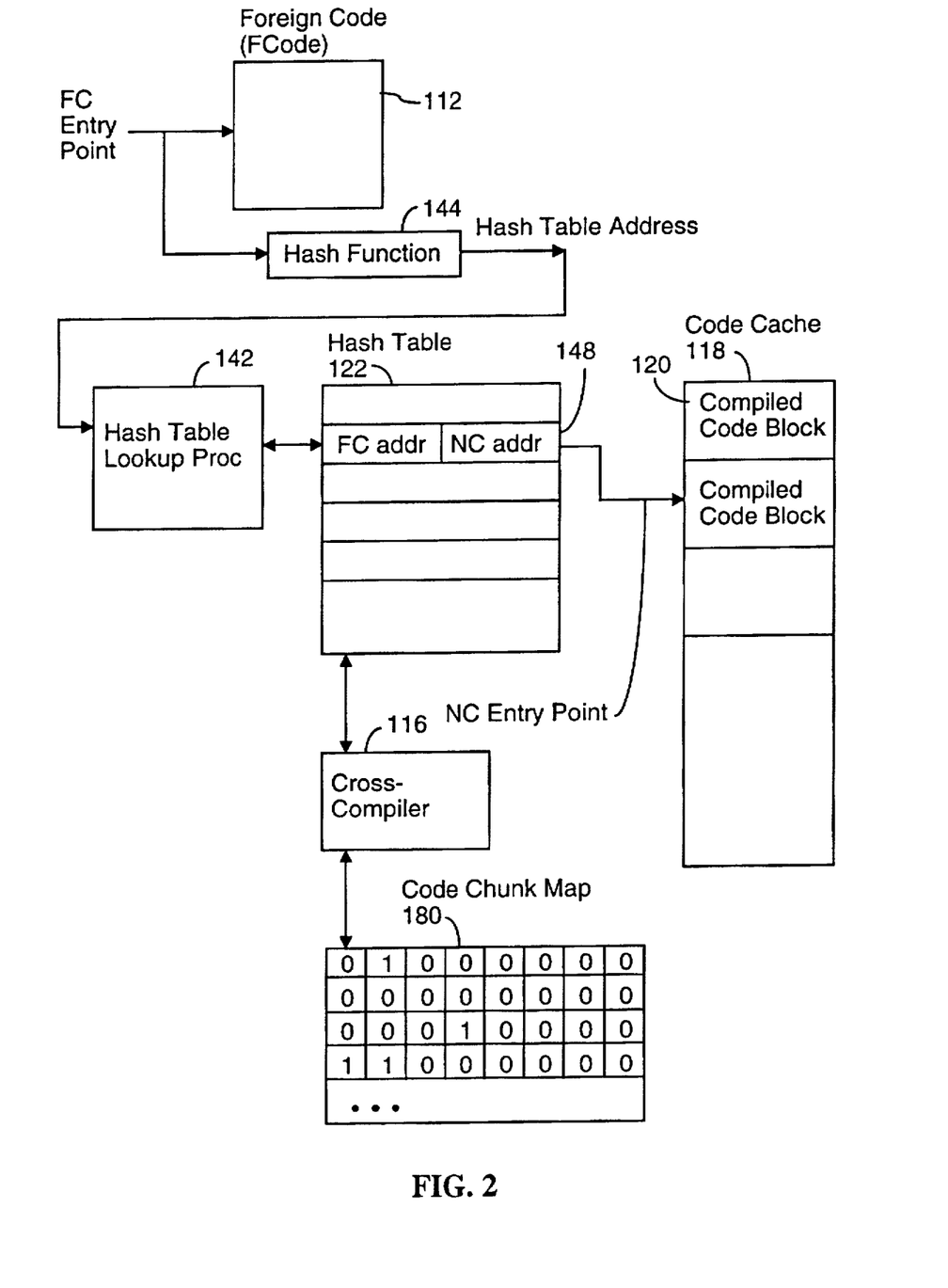
FIG. 2 is a block diagram of some of the data structures used by the preferred embodiment of the cross-compiler of the present invention during program execution.
Figure 3:
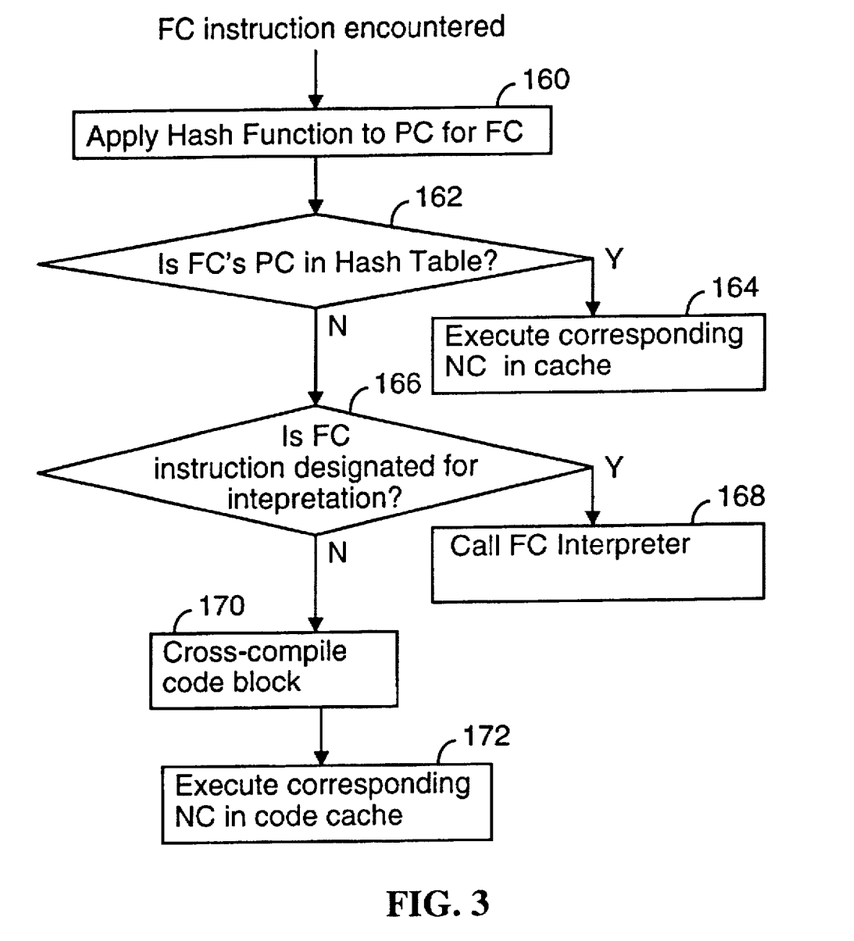
FIG. 3 is a flow chart of the procedure utilized by the preferred embodiment of the cross-compiler of the present invention to handle the execution of a non-native instruction.

Referring to FIGS. 1, 2 and 3, whenever a native code application invokes a non-native application, the dynamic recompiler 116 is activated. The recompiler 116 remains in control of program execution until execution of a native code application (excluding cross compiled programs in the code cache) is initiated. It should be understood that the code in non-native applications is essentially "data" that is processed by the cross-compiler because non-native code cannot be executed directly by the data processor.

Whenever the next instruction to be executed is a non-native instruction, that instruction is treated as an "entry point instruction." The recompiler 116 uses its hash table lookup procedure 142 to look up the address of the entry point instruction in the hash table 122 (160) to see if a corresponding native code block 120 is already stored in the code cache 118 (162). If so (162-Y), the native code block 120 in the code cache 118 is executed (164) until an exit instruction in the native code block is encountered.

The hash table lookup procedure 142 uses a hash function 144 to "hash" the address of any specified non-native code entry point so as to generate the address of a hash table entry 148. The hash function in a preferred embodiment is:

hash table address = hash table base address +

$$8 \times (EPadr \text{ bits } 17\text{--}29) + 65536 \times (EPadr \text{ bit } 1)$$

where "EPadr" means the entry point instruction's address, and where bit 1 of the entry point instruction's address is the second significant bit of the address. Bit 1 is of an instruction's address is generally equal to "1" for programs stored in the system's ROM 107, and is equal to "0" for programs in RAM (main memory).

Each entry 148 in the hash table 122 includes a foreign code entry point address and a corresponding native code entry point address. The native code entry point address is a location in a compiled code block 120 in the code cache 118.

When the hash table lookup procedure 142 is asked to locate an entry for a specified non-native code entry point, it inspects the hash table entry identified by the hash function, and if necessary additional hash table entries at successive locations in the table until (A) it locates a hash table entry for the specified non-native code entry point, in which case it returns the corresponding native code entry point address, or (B) it locates an empty hash table entry, in which case it returns a "failure" value, such as −1, because the hash table 122 does not contain an entry for the specified non-native code entry point.

If the entry point instruction in the non-native code application does not correspond to a code block in the code cache (162-N), the recompiler 116 begins recompilation of the corresponding code block. However, if during decoding of the entry point instruction by the recompiler it is determined that the entry point instruction is one of a predefined set of non-native instructions to be executed by an interpreter (166-Y), then that instruction is executed by the interpreter (168). Otherwise (166-N), the cross-compiler continues with compilation of a block of non-native code (170), and then the resulting native code block is executed (step 172).

Special Purpose Procedures for Handling Complete and Partial Cache Clear Instructions Cache flush and partial cache flush instructions are instructions for flushing all or a portion of the CPU's cache memory. These instructions are executed primarily by self-modifying programs, and are used to flush cache memory so as to prevent the CPU from executing instructions stored in cache memory that have been modified since they were stored in the cache. Since cache flush and partial cache flush instructions in a non-native program are essentially "hints" that the non-native program has just modified itself, the normal way of handling such instructions would be to simply clear the hash table 122 so as to prevent use of any of the cross-compiled code blocks 120, since it is unknown which instructions in the non-native code was modified.

Referring to FIG. 2, the recompiler 116 has two optimizations for handling cache flush instructions and partial cache flush instructions. In particular, for optimizing the handling of partial cache flush instructions the recompiler 116 maintains a "code chunk map" 180 for indicating, for each "page" of the address space, whether or not the code cache 118 stores at least one code block 160 corresponding to a non-native entry point instruction in the page. For instance, using a "page" size of 1 kilobyte (1024 bytes), the code chunk map 180 will store a "1" bit for each page that contains a non-native entry point instruction for which there is a code block in the code cache.

Whenever a non-native partial cache flush instruction is found in a code block that the recompiler is compiling, the partial cache flush instruction is recompiled into a procedure call to a special purpose partial cache flush procedure 146. That procedure 146 inspects the code chunk map 180 entries for the address range flushed from the cache, and for each code chunk map entry that is set a corresponding portion of the hash table is searched, and all entries for non-native entry point instructions in that portion of the hash table are cleared so as to prevent use of the corresponding code blocks in the code cache. Because the hash function 144 used by the recompiler is a linear function, the portion of the hash table 122 that corresponds to any entry in the code chunk map 180 is easily determined. In particular, all hash table entries between HashTableBeginClear and HashTableEndClear are cleared, where

| | |
|---|---|
| HashTableBeginClear = | HashFunction(first address corresponding to specified code chunk); and |
| HashTableEndClear = | HashFunction(last address corresponding to specified code chunk). |

The use of the code chunk map 180 enables the recompiler 116 to efficiently identify all code blocks in the code cache that are potentially invalid and to clear only their corresponding entries in the hash table. As a result, the recompiler's partial cache flush procedure 146 handles non-native partial cache flush instructions by (A) flushing the specified portion of the system's cache memory, and (B) clearing any corresponding entries in the hash table 122 and code chunk map 180. This is more efficient than simply invalidating all code blocks in the code cache 118, because it allows much of the previously cross-compiled code in the code cache 118 to continue to be used. This partial cache flush procedure 146 is also much more efficient than clearing all entries in the hash table corresponding to the flushed cache memory range because use of the code chunk map 180 greatly reduces the number of hash table entries that need to be cleared.

Whenever a non-native full cache flush instruction is found in a code block that the recompiler is compiling, the full cache flush instruction is recompiled into a procedure call to a special purpose full cache flush procedure 147 that clears all entries of the hash table 122 except for entries corresponding to procedures that are known not to be self-modifying. In particular, procedures stored in the computer's read-only memory (ROM) 107 can not be self-modifying and therefore the preferred embodiment of the present invention does not clear the hash table entries corresponding to code blocks for procedures stored in ROM 107 when it executes a full cache flush instruction.

In the preferred embodiment, the hash function 144 is designed so that the first half of the hash table 122 contains entries for non-native programs stored in RAM while the second half of the hash table stores entries for non-native programs stored in ROM. As a result, the full cache flush procedure 146 clears the first half of the hash table. If there are "overflow entries" in the second half of the hash table, those entries could also represent modifiable procedures and therefore such overflow entries are also cleared. If the last entry of the first half of the hash table is empty, then there are no "overflow entries." However, if the last entry of the first half of the hash table is not empty, then the "overflow entries" are all successive entries at the beginning of the second half of the hash table until an empty entry is encountered. For example, if the last entry of the first half of the hash table is not empty, and the next two successive entries (in the second half of the hash table) are also not empty, but the hash table entry immediately after that is empty, then the full cache flush procedure 146 will clear those first two entries in the second half of the hash table (as well as all entries in the first half of the hash table).

The procedure calls to the special purpose full and partial cache flush procedures 146,147 also operate as exit instructions for exiting the native code block in which those procedure calls are located. The reason for this is that the code block in which those procedure calls are located may have been invalidated by the full or partial cache flush, in which case it is important that the system stop executing that recompiled code block.

Cross-Compilation Procedure

Figure 4A:
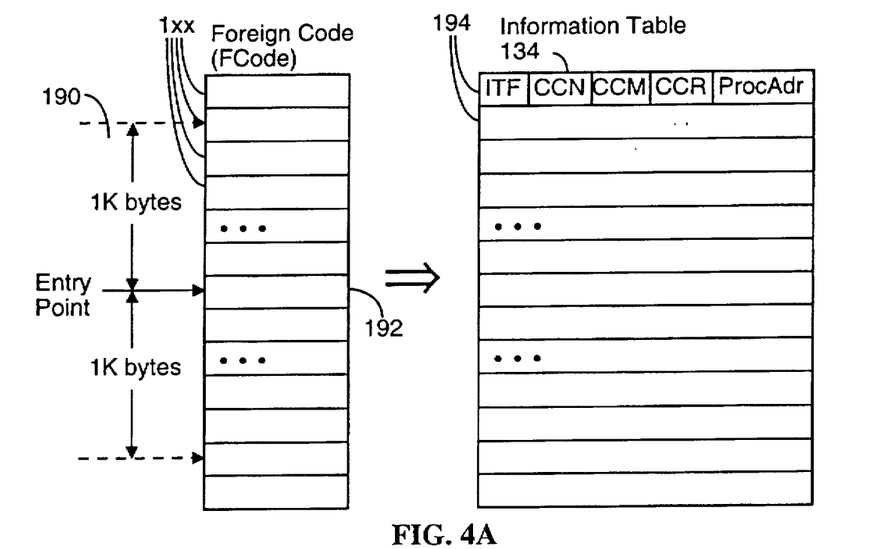
FIGS. 4A and 4B are block diagrams of some of the data structures used by the preferred embodiment of the cross-compiler of the present invention during code block cross-compilation.

Referring to FIG. 4A, the recompiler 116 cross-compiles an extended block of "qualifying" non-native code within a "compilation window" 190 of the entry point instruction 192. In the preferred embodiment the compilation window 190 begins one thousand bytes before the entry point instruction 192 and ends 1000 bytes after the entry point instruction 192. Qualifying non-native code is composed of all code that is reachable from the entry point instruction 192 during execution of the program without going outside the compilation window 190 and without having to first execute (A) an instruction handled by the interpreter, or (B) an instruction, such as a subroutine return instruction or a jump to an address in a register, whose successor instruction cannot be determined at compilation time. In the cross-compiled code, an exit instruction is inserted for each instruction to be emulated and for each instruction that causes or could cause execution of an instruction outside the compilation window.

The qualifying non-native code in the compilation window is sometimes called an "extended block" because the non-native code blocks compiled by the present invention are much larger than the "basic blocks" processed by conventional dynamic recompilers.

Each exit instruction in the compiled native code stores a non-native program counter (PC) value in a register reserved for that purpose, where the PC value designates the location of the next non-native instruction, if any, to be executed, and then returns control to the recompiler. In the preferred embodiment, when a non-native code program executes a "return" instruction that returns execution control to a native code application, the change in operating mode to executing native applications is handled by the interpreter 114. However, in alternate embodiments, the native code generated by the recompiler 116 for exit instructions that cause a return to a native code application includes a procedure call for causing the system to switch its mode of operation to execution of native code applications.

Figure 4B:
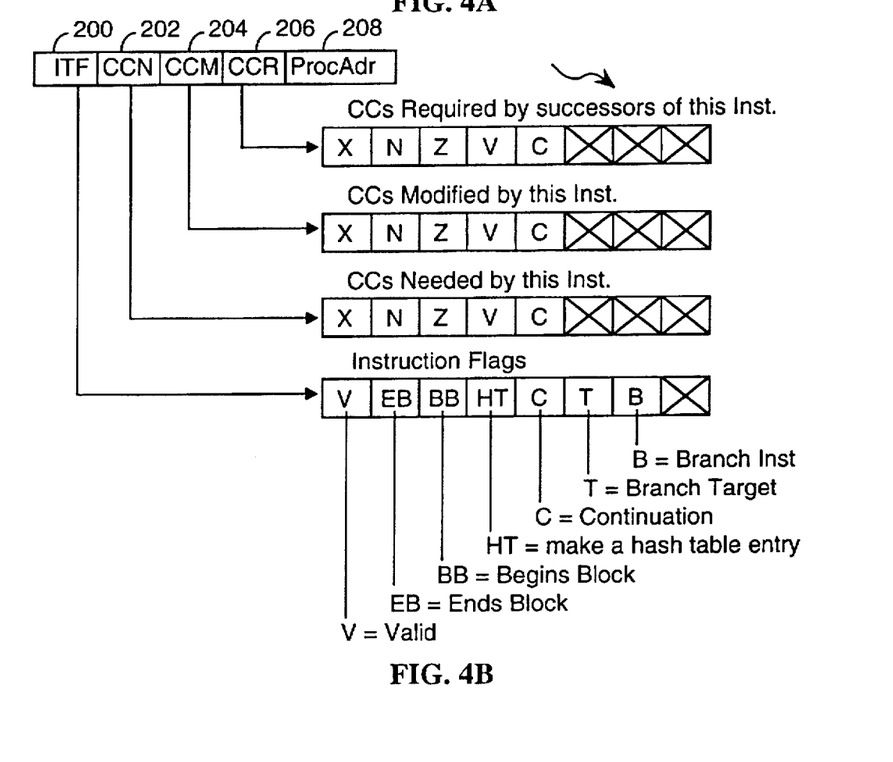

An information table 134 has a distinct entry 194 for every non-native instruction in the compilation window. Each information table entry has five components: a set of instruction flags 200, a set of "condition codes needed" (CCN) flags 202, a set of "condition codes modified" (CCM) flags 204, a set of "condition codes required" (CCR) flags 206, and a procedure address field 208. The instruction flags 200 include:

- a valid (V) flag that is set to True for all qualifying instructions in the compilation window and otherwise is set to False;
- a continuation (C) flag that is set true only for words in the qualifying instructions that constitute continuations of preceding instructions (e.g., where the continuation is an address parameter for the preceding instruction);
- a branch instruction (B) flag that is set true only for qualifying instructions that are branch instructions;
- a branch target instruction (T) flag that is set true only for qualifying instructions that are the target of a branch instruction, or that are the entry point instruction for the code block;
- block begin (BB) and end (EB) flags for marking the beginning and end of each simple block within the qualifying instructions; and
- the hash table entry (HT) flag identifies the entry point instruction.

Each of the sets of condition code flags contains one flag for each of the non-native condition codes associated with the non-native code that is being cross-compiled. In the preferred embodiment, there are five such condition codes, herein labeled X, N, Z, V and C. These five Motorola 68xxx condition codes do not have exact equivalents in PPC microprocessors and therefore have to be explicitly maintained by the cross-compiled code in order to exactly replicate the operation of the non-native code being cross-compiled.

During compilation of the qualifying code in a compilation window, the cross-compiler determines not only the non-native condition codes generated by each qualifying non-native instruction and the non-native condition codes needed to control the execution of the qualifying non-native instruction, but also determines all the non-native condition codes generated by the qualifying non-native instruction will not be used by any successors of the qualifying non-native instruction.

Figure 5:
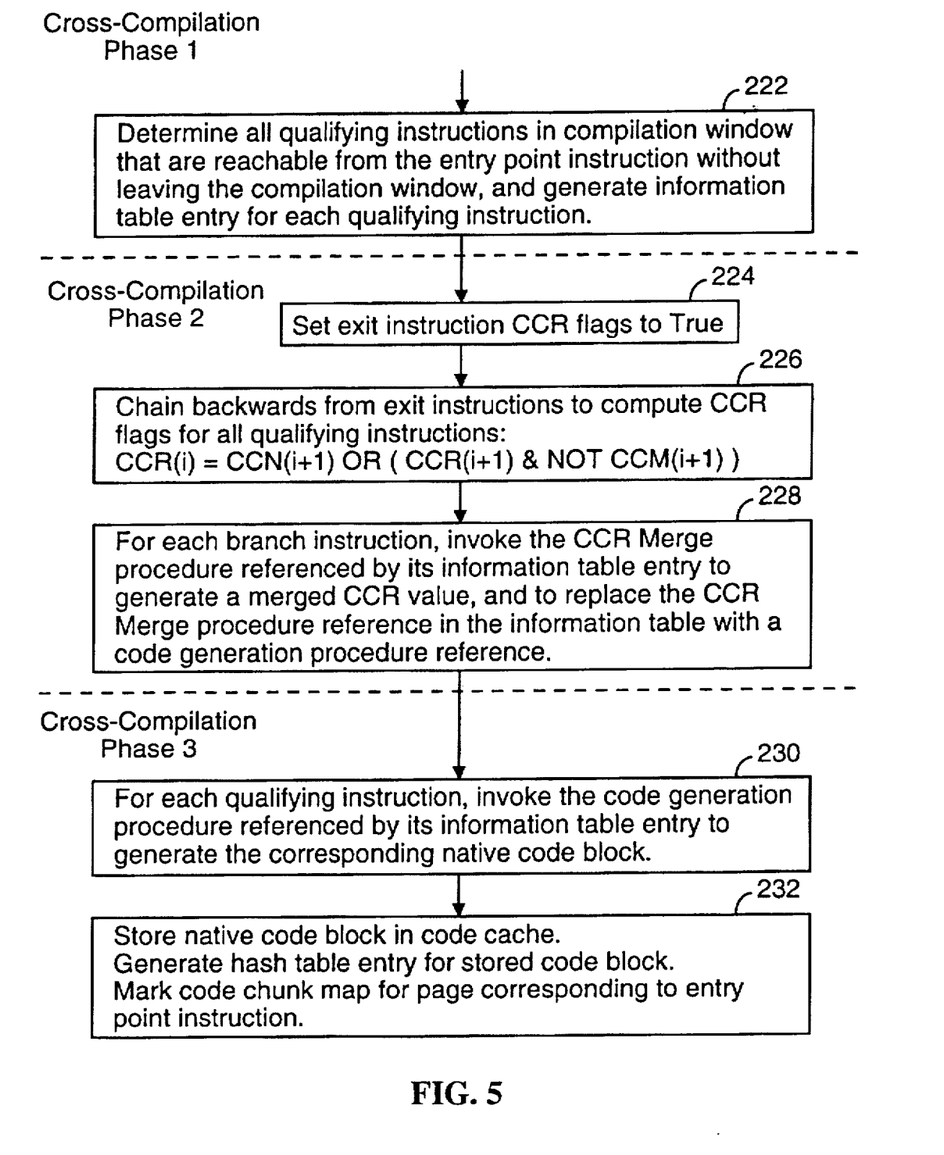
FIG. 5 is a flow chart of the cross-compilation procedure used in the preferred embodiment of the present invention.

Referring to FIGS. 4A, 4B, and 5, the cross-compilation process is a three phase procedure. It should be noted that all the entries in the information table are initially set to "invalid" when the recompiler is initialized, and that all entries in the information table used during a the recompilation of any particular code block are reset to "invalid" during the last step of the recompilation procedure (step 232).

During the first phase of the cross-compilation procedure, the decoder procedure 132 determines all "qualifying instructions" within the compilation window 190, and generates information table entries for those qualifying instructions (222). The qualifying instructions are all instructions reachable from the entry point instruction 192 that without going outside the compilation window 190 and without having to execute an instruction whose successor instruction cannot be determined at compilation time. Instructions that requiring "going outside the compilation window" include any instruction requiring execution by the interpreter 114.

The portions of the information table entry generated by the decoder procedure for each qualifying instruction are: the instruction flags 200 (including setting the valid flag V to true), the CCN and CCM flags 202, 204, and the procedure address 208. The procedure address 208 stored in each information table entry 194 is: (A) the address of a code generation procedure 140 for the corresponding non-native code instruction, unless the instruction is a branch or jump instruction, in which case it is (B) the address of a condition code processing procedure 138 for the corresponding non-native code instruction. However, if the target of the jump or branch instruction is outside the compilation window, the "Branch" instruction flag is not set in the corresponding information table entry 194, and the procedure address 208 stored in the corresponding information table entry 194 is the address of a code generation procedure 140 for that instruction. No special condition code processing is required for exit instructions, since the CCR flags 206 for exit instructions are always set to True.

Furthermore, for each non-native instruction that is sometimes a code block exit instruction (i.e., when it causes a jump outside the compilation window) and sometimes not (e.g., branch and jump instructions), the recompiler has two corresponding code generation procedures, one for use when the non-native instruction is an exit instruction and one for use when it is not an exit instruction.

The purpose of the information table 134 is to store the information required for cross-compilation and to avoid having to decode non-native instructions more than once.

The second phase of the cross-compilation procedure is to generate the "condition code required" (CCR) flags 206 in the information table 134. The basic formula for computing the CCR flags 206 for any non-native instruction is:

CCR(i)=CCN (i+1) OR (CCR(i+1) & NOT CCM(i+1))

where "&" indicates the logical AND operation, "i" is an instruction index indicating the instruction for which the CCR flags are being generated, and "i+1" is the instruction index for the next instruction to be executed immediately after the instruction for which the CCR flags are being generated. According to the above formula, the CCR flags for an instruction are the condition codes needed by the next instruction, as well as any condition codes required by the next instruction but excluding any condition code modified by that next instruction.

For "subroutine return" instructions and "jump" and "branch" instructions that branch outside the compilation window or branch to an unknown location, as well as any other instructions for which the successor instruction is not a qualifying instruction in the compilation window, the CCR flags are all set to true (224) because all of the condition code values may be needed by the successors to those instructions. These instructions that immediately precede exiting the compilation window are herein called "non-native code exit instructions."

The CCR flags for all qualifying instructions other than exit instructions are generated by "chaining" backwards from the last (i.e., highest address) qualifying instruction referenced by the information table to successively earlier ones of the entries in the information table (226). While processing the CCR flags in the information table entries in reverse order, the CCR flags for each exit instruction are set to True. For instructions other than exit, branch and jump instructions, the CCR flags are computed using the basic CCR computation formula:

CCR(i)=CCN (i+1) OR (CCR(i+1) & NOT CCM(i+1))

For branch and jump instructions (indicated in the information table by the "B" instruction flag being set to True), the procedure address in the corresponding information table entry is a condition code processing procedure. For unconditional branch and jump instructions that are not exit instructions, if the jump is a forward jump, the CCR is computed using the formula:

CCR(i)=CCN(s1) OR (CCR(s1) & NOT CCM(s1))

where s1 is the target of the unconditional branch or jump instruction.

For unconditional branch and jump instructions that are not exit instructions, if the jump is a backward jump, the CCR for that instruction is computed using the special formula:

CCR(i)=CCN(s1) OR NOT CCM(s1)

where s1 is the target of the unconditional branch or jump instruction. This CCR computation formula, which is equivalent to the standard CCR computation formula with CCR(s1) set equal to True, uses the assumption that the successors to the branch or jump's target instruction require all condition codes.

Conditional branch instructions require additional processing because branch instructions have two successor instructions and the two execution paths may require the maintenance of different non-native condition codes. In particular, the CCR flag values for conditional branch instructions are computed using the following "CCR merger" formula:

$$CCR(i) = \{CCN(i+1)\text{OR}(CCR(i+1)\&\text{NOT }CCM(i+1))\}\text{OR}$$
$$\{CCN(s1)\text{OR}(CCR(s1)\&\text{NOT }CCM(s1))\}$$

where "s1" is the instruction index for a successor instruction other than the next instruction (i.e., the branch target instruction). If the branch target instruction corresponding to s1 is located before the conditional branch instruction (i.e., it is a backwards jump), the CCR(s1) value in the above formula is set to True before the value of the CCR(i) is computed. This is done because the CCR(s1) value has not yet been computed and setting it to True is the most conservative option available.

For each distinct non-native branch and jump instruction in the non-native code language there is a corresponding distinct condition code processing procedure 138. Each such condition code processing procedure performs the corresponding CCR(i) computation step, as described above.

In addition to computing CCR flags for a particular branch or jump instruction, each CCR processing procedure replaces the address pointer 208 for the branch or jump instruction in the information table with the address for the code generation procedure corresponding to that branch or jump instruction. To avoid having to re-decode the non-native branch and jump instructions, a distinct CCR merge procedure is used for each distinct non-native branch and jump instruction, even though the CCR merge methodology is the same for multiple ones of those branch and jump instructions, because each distinct CCR merge procedure includes instructions for inserting a different code generation procedure address 208 in the information table 134.

The third phase of the recompilation procedure consists of generating the native code for the qualifying non-native instructions by executing the code generation procedures noted in the information table for all the qualifying instructions (230). After the native code is generated, the resulting native code block is stored in the code cache, an entry for the stored code block is generated in the hash table, and the code chunk map is marked for all pages corresponding to the non-native qualifying instructions (232). With respect to the code chunk map, it is possible for the qualifying instructions in a code block to reside in more than one memory page, and therefore it is possible for more than one code chunk in the code chunk map to be marked by the recompiler.

Often the majority of the native code generated by a cross-compiler is dedicated to keeping track of and using non-native condition codes (i.e., the condition codes associated with the computer platform for which the non-native application was written). The CCR flags generated during the second phase of the compilation process are used to reduce the amount of native code required to track and use the non-native condition codes. In particular, during the third phase of the cross-compilation process, native code instructions are generated by each of the code generation procedures to store condition code values only for those non-native condition codes that are (A) generated by the current non-native instruction, and (B) that are required by successor instructions:

CCs for which storage instructions are generated=CCM(i) & CCR(i)

As a result, the present invention avoids the generation of instructions for storing and manipulating non-native condition codes that are not used by any of the subsequent instructions.

The code generation procedures in the preferred embodiment of the present invention implement additional code optimizations, which are described next.

Since conditional branch instructions are often used at the end of execution loops in programs, conditional branch instructions are often executed large numbers of times. The inventors have determined that optimization of the cross-compilation of such instructions is likely to have a disproportionately beneficial affect on the execution performance of cross-compiled programs. In particular, the code generation procedures for conditional branch instructions minimize the native code instructions generated by minimizing the number of native code instructions used to handle non-native condition codes.

More particularly, the code generation procedure for each conditional branch instruction determines whether the conditional branch instruction for which code is being generated is the target of any other branch instruction(s) within the compilation window and whether it is immediately preceded by a comparison instruction. If the conditional branch instruction is the target of another branch instruction within the compilation window (or is an entry point instruction), and is immediately preceded by a comparison instruction, the code generation procedure converts the non-native comparison instruction into native instructions for generating and storing non-native condition codes, and converts the conditional branch instruction into a sequence of instructions for determining the status of the relevant non-native condition codes prior to performing a conditional branch. In a preferred embodiment the two non-native instructions:

| cmp.l | d0, d1 |
| blt.s | @target | are converted into eight native instructions:

| subfco | r6, r8, r9 | set Z, V, C flags |
| addc | r3, r8, r6 | invert the C flag |
| beq | @x | skip if equal |
| mfxer | r5 | instructions for handling 68xxx "less than" computation |
| rlwinm | r5, r5, 8, 24, 27 | |
| mtcrf | 2, r5 | |
| creqv | cr6_LT, cr0_LT, cr6_GT | |
| blt- | cr6, @target | the branch instruction |

@x successor instruction

However, when a conditional branch instruction is not the target of another branch instruction within the compilation window, is not an entry point instruction, and is immediately preceded by a comparison instruction (which is very often the case), the cross-compiler generates two native code instructions, a native comparison instruction and a native conditional branch instruction:

| cmpw | cr6, r8, r9 |
| blt | cr6, target |

If execution of the non-native branch instruction is followed by execution of any instruction requiring the non-native condition codes, as indicated by the CCR flags for the conditional branch instruction, then two additional native instructions are generated to set and store those condition codes (i.e., the first two native instructions shown in the above listing of the eight standard native code instructions generated for a non-native conditional branch instruction). Otherwise, the native instructions for setting and storing the non-native condition codes are not generated.

No instructions for reading stored non-native condition codes and branching based on the stored non-native condition codes (i.e., the third through seventh instructions in the above listing of the eight standard native code instructions generated for a non-native conditional branch instruction) are needed, because the branch instruction's operation is governed entirely by the immediately preceding comparison instruction. Thus, this optimization reduces the number of native instructions generated from eight to two, or eight to four, for executing the type of condition branch often found at the end of execution loops.

A second optimization performed on the native code generated for branch instructions is that the corresponding code generation procedures in the preferred embodiment determine whether (A) the non-native branch instruction is not the target of another branch instruction, and (B) the immediately preceding instruction always clears a flag on which the branch instruction depends.

When these conditions are met, the native code instructions for testing the value of the cleared condition flag is omitted, thereby reducing the number of native code instructions generated. For instance, if a branch instruction depends on a logical combination of the Z flag, V flag and N flag, and the V flag is known by inspection of the prior instruction to be always cleared, then the branch instruction can be made to depend on just the value of the Z and N flags.

For example, the following two 68000 instructions:

| tst.l | d0 | clears V flag, sets N if d0 < 0, sets Z flag if d0=0 |
|---|---|---|
| blt.s | @target | branch to target if d0 is less than 0. Condition code basis for branch is: Not Z & ((V & Not N) or (Not V & N)) | where "&" represents the logic "AND" operation, would normally be cross-compiled into the following PPC code:

| addco. | r3, r8, r0 | clears C and V flags, sets Z and N flags based on value in r8 |
|---|---|---|
| beq | @x | branch to x if equal to zero |
| mfxer | r5 | condition code processing |
| rlwinm | r5, 45, 8, 24, 27 | |
| mtcrf | 2, r5 | |
| crequ | cr6+LT, cr0__Lt, cr6__GT | |
| blt- | cr6, @target | |
| @x | {successor instruction} | |

However, in accordance with the present invention, the code generator procedure for the blt.s instruction determines that the V bit will always be cleared, and therefore, if the blt.s instruction is not the target of any other branch instruction, the PPC code can be reduced to:

| addco. | r3, r8, r0 | clears C and V flags, sets Z and N flags based on value in r8 clears Z flag when r8 equals 0 set N when r8 < 0 |
|---|---|---|
| blt | cr0, @target | branch to target if N flag is set | in the above example, the full logic condition for branching:

Not Z & ((V & Not N) or (Not V & N))

can be reduced to

Not Z & N because the immediately preceding 68000 instruction, tst.l, always clears the V flag. Further, because Z and N are mutually exclusive after execution of the PPC "addco." instruction (i.e., if N is True then Z is false), the logic condition for branching can be further reduced simply to "N" (i.e., branch if the N flag is set). As a result, the code generator of the present invention in this example generates two native (i.e., PPC) code instructions instead of seven to implement in the 68000 test and branch instruction sequence shown above.

Alternate Embodiments

Most implementations of the present invention other than the preferred embodiment will not utilize both a non-native code interpreter as well as a cross-compiler. As a result, in most implementations of the present invention all non-native instructions will be cross-compiled into native instructions.

While the preferred embodiment uses a compilation window of about 2000 bytes (i.e., about 500 instruction words), in other embodiments of the present invention the compilation window might be smaller or larger. Generally, to obtain the code optimization advantages of the present invention, the compilation window will preferably be at least 100 instruction words in size (i.e., extending at least 50 instructions before and after the entry point instruction), and preferably the compilation window will be sized to include at least 200 non-native instruction words. In addition, the compilation window will also preferably be no larger than 2000 instruction words, and more preferably no larger than 1000 instruction words, because further enlargement of the compilation window will result in the compilation of excessive amounts of code that is never executed, without compensating improvements in the efficiency of the generated native code.

The code optimizations implemented by any particular version of the cross-compiler will depend, in part, on the differences and similarities between the condition codes of the non-native and native code languages.

The present invention can also be used to recompile machine independent programs such as Java bytecode programs, into native code.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system having data processor, a method of dynamically compiling portions of non-native applications into native code blocks during execution of the non-native applications, comprising the steps of:

receiving a request to execute a specified instruction in a specified non-native application;

defining a compilation window composing a subset of the non-native instructions in said specified non-native application, said compilation window including an entry point instruction, comprising said specified instruction, and a block of at least one hundred non-native instructions that includes said entry point instruction;

defining as qualifying instructions all non-native instructions in said compilation window that are reachable from the entry point instruction during execution of the non-native application without executing non-native instructions outside the compilation window and without having to first execute a non-native instruction whose successor instruction cannot be determined during compilation of said non-native application;

cross-compiling said qualifying instructions into a block of native code instructions;

storing said native code block in a code cache in said computer system's memory, and storing in a look-up table, stored in said memory, an entry cross-referencing said entry point instruction with said native code block's location in said code cache; and invoking execution of said block of native code instructions beginning at a native code instruction in said block of native code instructions that corresponds to said entry point instruction.

2. The method of claim 1, further including, prior to said cross-compiling step, storing in an information table for each of qualifying instructions data representing non-native condition codes used by said each qualifying instruction, non-native condition codes modified by said each qualifying instruction, and non-native condition codes required for use by successors of said each qualifying instruction; and said cross-compiling step including generating for each said qualifying instruction a set of native code instructions to generate and store values for only those of said non-native condition codes that, in accordance with said data in said information table, are both modified by said qualifying instruction and are required for use by successors of said qualifying instruction.

3. The method of claim 2, said cross-compiling step including determining for each said qualifying instruction composing a branch instruction that is not itself a target of any branch instruction among said qualifying instructions whether said branch instruction's immediate predecessor instruction always sets or always clears a non-native condition code utilized by said branch instruction, and when said determination is positive generating an optimized set of native code instructions for said preceding instruction and said branch instruction that do not process said non-native condition code that is always set or always cleared by said predecessor instruction.

4. The method of claim 1, said cross-compiling step including generating for each said qualifying instruction composing a full cache flush instruction a native code instruction that invokes a first predefined procedure, said first predefined procedure clearing said computer system's cache memory and clearing all entries in said look-up table other than entries corresponding to non-native applications known not to be self-modifying applications.

5. The method of claim 1, said cross-compiling step including generating for each said qualifying instruction composing a full cache flush instruction a native code instruction that invokes a first predefined procedure, said first predefined procedure clearing said computer system's cache memory and clearing all entries in said look-up table other than entries corresponding to non-native applications stored in a read only memory in said computer system.

6. The method of claim 1, further including, defining a code chunk map that includes an entry for each page of said computer system's memory, each said entry indicating for an associated page of said memory whether said code cache stores at least one code block corresponding to a non-native entry point instruction in said associated page;

said cross-compiling step including setting an entry in said code chunk map corresponding to said entry point instruction's location in said computer system's memory; and said cross-compiling step further including generating for each said qualifying instruction composing a partial cache flush instruction a native code instruction that invokes a predefined partial cache flush procedure, said predefined partial cache flush procedure clearing a specified address range from said computer system's cache memory, inspecting the code chunk map entries corresponding to the specified address range flushed from the cache memory, and for each such code chunk map entry that indicates said code cache contains a code block corresponding to a non-native entry point instruction in said associated page, clearing a corresponding portion of the lookup table so as to prevent use of the corresponding code blocks in the code cache.

7. A computer program product for directing a computer to dynamically compile portions of non-native applications into native code blocks during execution of the non-native applications, the computer program product comprising a computer readable storage medium and a computer program mechanism embedded therein, the computer program mechanism comprising:

(A) a decoder procedure for decoding at least a portion of a specified non-native application that includes a specified instruction, said decoder procedure including instructions for:

(A1) defining a compilation window composing a subset of the non-native instructions in said specified non-native application, said compilation window including an entry point instruction, comprising said specified instruction, and a block of at least one hundred non-native instructions that includes said entry point instruction; and (A2) defining as qualifying instructions all non-native instructions in said compilation window that are reachable from the entry point instruction during execution of the non-native application without executing non-native instructions outside the compilation window and without having to first execute a non-native instruction whose successor instruction cannot be determined during compilation of said non-native application; and (B) a cross-compilation procedure for compiling said qualifying instructions into a block of native code instructions;

said cross-compiling procedure including instructions for storing said native code block in a code cache in said computer system's memory, and storing in a look-up table, stored in said memory, an entry cross-referencing said entry point instruction with said native code block's location in said code cache.

8. The computer program product of claim 7, said decoder procedure including instructions for (A3) storing in an information table for each of qualifying instructions data representing non-native condition codes used by said each qualifying instruction, non-native condition codes modified by said each qualifying instruction, and non-native condition codes required for use by successors of said each qualifying instruction; and said cross-compiling procedure including instructions for generating for each said qualifying instruction a set of native code instructions to generate and store values for only those of said non-native condition codes that, in accordance with said data in said information table, are both modified by said qualifying instruction and are required for use by successors of said qualifying instruction.

9. The computer program product of claim 8, said cross-compiling procedure including instructions for determining for each said qualifying instruction composing a branch instruction that is not itself a target of any branch instruction among said qualifying instructions whether said branch instruction's immediate predecessor instruction always sets or always clears a non-native condition code utilized by said branch instruction, and when said determination is positive generating an optimized set of native code instructions for said preceding instruction and said branch instruction that do not process said non-native condition code that is always set or always cleared by said predecessor instruction.

10. The computer program product of claim 7, said cross-compiling procedure including instructions for generating for each said qualifying instruction composing a full cache flush instruction a native code instruction that invokes a first predefined procedure, said first predefined procedure clearing said computer system's cache memory and clearing all entries in said look-up table other than entries corresponding to non-native applications known not to be self-modifying applications.

11. The computer program product of claim 7, said cross-compiling procedure including instructions for generating for each said qualifying instruction composing a full cache flush instruction a native code instruction that invokes a first predefined procedure, said first predefined procedure clearing said computer system's cache memory and clearing all entries in said look-up table other than entries corresponding to non-native applications stored in a read only memory in said computer system.

12. The computer program product of claim 7, said cross-compiling procedure including instructions for defining a code chunk map that includes an entry for each page of said computer system's memory, each said entry indicating for an associated page of said memory whether said code cache stores at least one code block corresponding to a non-native entry point instruction in said associated page;

said cross-compiling procedure including instructions for setting an entry in said code chunk map corresponding to said entry point instruction's location in said computer system's memory; and said cross-compiling procedure further including instructions for generating for each said qualifying instruction composing a partial cache flush instruction a native code instruction that invokes a predefined partial cache flush procedure, said predefined partial cache flush procedure clearing a specified address range from said computer system's cache memory, inspecting the code chunk map entries corresponding to the specified address range flushed from the cache memory, and for each such code chunk map entry that indicates said code cache contains a code block corresponding to a non-native entry point instruction in said associated page, clearing a corresponding portion of the lookup table so as to prevent use of the corresponding code blocks in the code cache.

\* \* \* \* \*